(12) United States Patent
Esin et al.

(10) Patent No.: US 8,415,638 B2
(45) Date of Patent: Apr. 9, 2013

(54) METHOD FOR DETECTING HIGH-ENERGY RADIATION USING LOW VOLTAGE OPTIMIZED ION CHAMBER

(75) Inventors: Alexander Joseph Esin, Sugar Land, TX (US); Alex Kulik, Sugar Land, TX (US); Nikolay Baturin, Sugar Land, TX (US)

(73) Assignee: Thermo Fisher Scientific Inc., Sugar Land, TX (US)

( * ) Notice: Subject to any disclaimer, the term of this patent is extended or adjusted under 35 U.S.C. 154(b) by 283 days.

(21) Appl. No.: 12/852,347

(22) Filed: Aug. 6, 2010

(65) Prior Publication Data

US 2012/0032089 A1 Feb. 9, 2012

(51) Int. Cl.
*G01T 1/185* (2006.01)
(52) U.S. Cl. ............ 250/375
(58) Field of Classification Search ........ 250/375
See application file for complete search history.

(56) References Cited

U.S. PATENT DOCUMENTS

| | | | | |
|---|---|---|---|---|
| 4,924,098 | A * | 5/1990 | Wasserman | 250/380 |
| 4,970,391 | A | 11/1990 | Uber, III | |
| 6,353,324 | B1 | 3/2002 | Uber, III et al. | |
| 7,368,726 | B2 * | 5/2008 | Esin et al. | 250/386 |
| 2005/0220246 | A1 | 10/2005 | Masterov et al. | |

FOREIGN PATENT DOCUMENTS

| | | |
|---|---|---|
| EP | 1586918 A2 | 10/2005 |
| JP | 2005257383 A | 9/2005 |
| JP | 2008145264 A | 6/2008 |

OTHER PUBLICATIONS

Physics in Medicine and Biology (2001), vol. 46, Bahar-Gogani et al., "Long-term stability of liquid ionization chambers with regard to their qualificatin as local reference dosimeters for low dose-rate absorbed dose measurements in water," pp. 729-740.
Combined Search and Examination Report dated Dec. 14, 201, received in corresponding GB patent application No. GB1113361.8, 10 pages.
Patent Abstract for Japanese Publication No. JP2005257383, Published Sep. 22, 2005 (1 page).
Patent Abstract for Japanese Publication No. JP2008145264, Published Jun. 26, 2008 (1 page).

* cited by examiner

*Primary Examiner* — Constantine Hannaher
(74) *Attorney, Agent, or Firm* — Osha Liang LLP

(57) ABSTRACT

A method for measuring high-energy radiation flux, comprising applying a low voltage to electrodes in an ion chamber filled with a fluid capable of forming ions through the interaction of the fluid with high energy radiation; measuring an ion current signal related to an ion current induced by the low voltage; determining a leakage current; determining a gain; determining a magnitude of the high-energy radiation flux based on the ion current signal, gain, and leakage current; and outputting the result of the magnitude of the high-energy radiation flux.

10 Claims, 8 Drawing Sheets

METHOD FOR DETECTING HIGH-ENERGY RADIATION USING LOW VOLTAGE OPTIMIZED ION CHAMBER

BACKGROUND OF INVENTION

1. Field of the Invention

The present disclosure relates generally to high-energy radiation monitoring and detection; more particularly, it relates to an ion chamber for detecting high-energy radiation.

2. Background Art

Detectors of high-energy, ionizing radiation are used in various applications. Such detectors, for example, include ion chambers, proportional counters, Geiger-Mueller counters, and scintillation counters. Among these, ion chambers are commonly used in neutron detectors. FIG. 1 shows a basic system for neutron detection that includes a target chamber 13, an ion chamber 14, and electronics. Fast neutrons 12 are produced by a neutron source 11. These fast neutrons 12 interact with hydrogen nuclei in the target chamber 13 until their velocity is reduced to the average thermal velocity of the target. The thermal (slow) neutrons are then scattered from the target 13 to the ion chamber 14.

In a typical neutron detector, the ion camber 14 is filled with a gas (such as He-3) that can interact with the thermal neutrons to produce ions. When a He-3 atom absorbs (captures) a thermal neutron, a nuclear reaction occurs and the resultant products are fast-moving tritium (H-3) and a proton. These fast-moving particles travel through the gas, ionizing some of the remaining He-3 atoms and thus creating an equal number of positive and negative ions. When a voltage is applied across the electrodes 15, 16 in the ion chamber 14, an electric field is created in the space between the electrodes. The ions move in response to the electric field with the positive and negative ions pulled in opposite directions toward each electrode. The ions are eventually neutralized at electrodes 15 and 16 resulting in an ion current that is directly proportional to the number of ions transferred to the electrodes. The number of ions transferred to the electrodes depends on their formation rate and hence the neutron flux. Thus, the ion currents measured by the ion chamber may be used to derive the magnitude of the neutron flux.

The ion current-voltage (I-V) characteristic curve for a gas in an ionization detector usually contains a flat region, called the "region of saturation" or "plateau." Shown in FIG. 3 is an example of an ion I-V characteristic curve for an ion chamber filled with He-3. As seen in FIG. 3, in the plateau region, the ion current is insensitive to the voltage applied to the electrodes. Therefore, it is advantageous to operate the detector in this region because any noise in the applied voltage is minimally coupled to the ion current. The exact voltages at the beginning and end of the plateau region depend on the specific chamber geometry, but for a typical ionization detector employing He-3, the plateau begins around 10V. Operation of these detectors below 10V leads to increased noise and weak ion current, and therefore such detectors require high operating voltages (greater than 10V in the example shown in FIG. 3). Other (heavier) gases requires much higher voltage to reach plateau, usually 400, 600V.

However, in general, gases employed in ionization detectors need not have a plateau in their current-voltage characteristics. For example, the relative scarcity of He-3 has lead to the use of gases such as $BF_3$, which is known not to have a plateau in its I-V characteristic curve, as shown in FIG. 4. Rather, the ion current steadily increases with increasing voltage. As a result, ionization detectors based on $BF_3$ are more susceptible to noise than their He-3 counterparts.

As is the case with all known ionization detectors, the ion current generated by the ionizing radiation is extremely small (on the order of $10^{-12}$ A), making it very difficult to accurately determine neutron flux. In addition, temperature and humidity changes in various electronic components, cables, etc. may further compromise the accuracy of the measurements. The situation is even worse under field conditions, which often include wide variations in temperature and humidity in addition to unwanted sources of vibration.

Furthermore, instability in leakage currents may also significantly degrade the accuracy of repeat measurements. Leakage current is a current through the detector system that is not due to ion transport through the ion chamber 14. Leakage currents may be due to cables, connections, parasitic current in the components, moisture contamination of the amplifier circuit or other components, or any number of other factors. Thus, leakage current depends on a highly convoluted function of temperature, humidity, age of components, and any number of other factors. Because the ion current in an ion chamber is on the order of $10^{-12}$ A or less, leakage current may be a significant fraction of the total measured current, and any variation in the leakage current may significantly impact the accuracy of the measurements.

In a setup described above and shown in FIG. 1 and FIG. 5, the ion chamber (or counter) is maintained at an equilibrium high voltage $V_0$ (i.e., constant voltage mode) so that it is ready to detect constant flux of high-energy radiation (e.g., the ion chamber for detecting neutron flux shown in FIG. 1) or pulses of high-energy radiation (e.g., proportional counters or Geiger-Mueller counters for detecting gamma rays). In addition, modern chambers operate in a pulsed high voltage mode, in which the voltage applied across the electrodes in the ion chamber is pulsed. That is, the ion chamber is not maintained at an equilibrium high voltage. Rather, these devices may use pulses of high voltage to monitor or measure neutron flux or other ion generation in a steady state.

There remains a continuing need for ion chambers that provide more reliable and accurate measurements of high-energy radiation.

SUMMARY OF INVENTION

In one aspect, embodiments disclosed herein relate to a method for measuring high-energy radiation flux, comprising applying a low voltage to electrodes in an ion chamber filled with a fluid capable of forming ions through the interaction of the fluid with high energy radiation; measuring an ion current signal related to an ion current induced by the low voltage; determining a leakage current; determining a gain; determining a magnitude of the high-energy radiation flux based on the ion current signal, gain, and leakage current; and outputting the result of the magnitude of the high-energy radiation flux.

In another aspect, embodiments disclosed herein relate to method for measuring high-energy radiation flux, comprising applying a low voltage to electrodes in an ion chamber filled with a fluid capable of forming ions through the interaction of the fluid with high energy radiation; measuring a ion current signal related to an ion current induced by the low voltage; applying the low voltage at a negative polarity across the electrodes; measuring a negative ion current signal related to ion currents induced by the low voltage at the negative polarity; determining a magnitude of the high-energy radiation flux based on the positive and negative ion current signals; outputting the result of the magnitude of the high-energy radiation flux; applying a time varying voltage across the electrodes such that the ion chamber conducts a current small enough that ion transport does not occur; and determining a gain.

In another aspect, embodiments disclosed herein relate to method for measuring high-energy radiation flux, comprising applying a first voltage to electrodes in an ion chamber filled with a fluid capable of forming charged ions by high energy radiation, measuring a ion current signal related to an ion current induced by the first voltage; determining an optimal voltage by lowering the first voltage to a low voltage; measuring an optimal ion current signal related to an ion current induced by the optimal voltage; determining a magnitude of the high-energy radiation flux based on the optimal ion current signal, gain, and leakage current; and outputting the result of the magnitude of the high-energy radiation flux.

In another aspect, embodiments disclosed herein relate to a system for measuring high-energy radiation flux, comprising an ion chamber comprising a material ionizable by the high-energy radiation flux and two electrodes disposed in the ion chamber; and a circuit connected to the two electrodes, wherein the circuit is configured to provide low voltage to the two electrodes and measure an electrical current across the two electrodes, wherein the circuit is configured to determine a magnitude of the high-energy radiation flux based on the electrical current.

DETAILED DESCRIPTION

Embodiments of the present disclosure relate to ion chambers for measuring high-energy radiation. "High-energy radiation" as used herein refers to neutrons, X-rays, gamma rays, α-particles, and β-particles. For clarity of illustration, the following description uses an ion chamber for neutron detection as an example; however, embodiments of the present disclosure are not so limited. An ion chamber for neutron counting in accordance with one embodiment of the present disclosure may be operated at low voltage in a pulse mode, as well as at low voltage in a continuous mode.

According to the International Electrotechnical Commission (IEC), low voltage circuits are those operating in a range of 50-1000 V AC or 120-1500 V DC and extra low voltage circuits are those operating with a voltage less than 50 V AC or less than 120 V DC. In this disclosure, the term "low voltage" is defined to include voltages that may fall in the range of either "low voltage" or "extra low voltage" as defined by the IEC. For example, in certain embodiments, low voltage may refer to any voltage less than 1000, while in certain embodiments low voltage may refer to voltages in the range of about 5V to about 20V.

Figure 1:
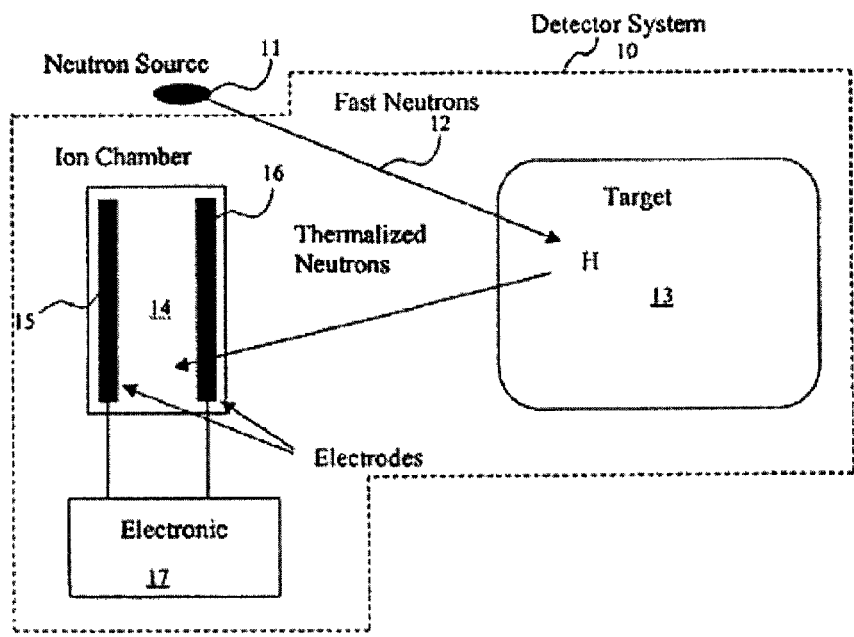
FIG. 1 shows a neutron detection system.

FIG. 1 shows a detector system 10 for neutron detection. As shown, neutron source 11 generates fast neutrons 12, a fraction of which will scatter into the target chamber 13, which may be filled with a hydrogenous material. "Hydrogenous material" refers to a material having hydrogen nuclei. The neutron source 11 is not part of the detector system 10. The fast neutrons 12 collide with the hydrogen nuclei in the target chamber 13. Hydrogen nuclei, with a similar mass as that of a neutron, are very efficient in slowing down the fast neutrons. As a result of the interactions with hydrogen nuclei, fast neutrons lose kinetic energy and become slower (thermal) neutrons. The thermal neutrons are scattered into an ion chamber 14. The ion chamber 14 is typically filled with a gas having nuclei that may capture thermal neutrons and undergo nuclear reactions after neutron capture. Such nuclei include boron (B-10, e.g., $BF_3$), lithium (Li-6), helium (He-3), uranium-233, uranium-235, and plutonium-239. Among these, He-3 gas has the advantage of having a large thermal neutron cross section (5330 barns) and, therefore, is commonly used in the ion chamber. The following description uses He-3 as an example. However, one of ordinary skill in the art would appreciate that embodiments of the present disclosure are not so limited. In fact, embodiments of the present disclosure may use any gas or other medium capable of ion transport that may produce ions by the high-energy radiation of interest. For example, some embodiments of the present disclosure may include fissile isotopes that do not form gaseous compounds. In such a case, the ion chamber 14 may include a fluid that includes such fissile materials. It is noted that a fluid includes both a gas and a liquid.

As shown in FIG. 1, a typical ion chamber 14 includes two electrodes 15, 16, which may include a pair of parallel plates or any other convenient geometry. A voltage is applied across the electrodes 15, 16 by an electronic module 17. While a box-shaped ion chamber is shown, one of ordinary skill in the art would appreciate that various configurations of the ion chambers may be used. For example, the ion chamber may be a cylinder with one electrode disposed on the inside surface of the cylinder and the other electrode placed at the axis (center) of the cylinder. He-3 gas in the ion chamber 14 normally serves as an insulator, and, therefore, no current (except for a small leakage current) is detectable between the two electrodes 15, 16 by the electronics module 17.

When a He-3 atom absorbs (captures) a thermal neutron, a nuclear reaction occurs as follows:

$$_2^3He + _0^1n \rightarrow _1^3H + _1^1p \qquad (1)$$

This nuclear reaction produces tritium (H-3) and a proton. He-3 and H-3 are isotopes of helium and hydrogen, respectively. This reaction also releases energy of approximately 764 keV (i.e., Q-value=764 keV), and, therefore, the tritium and the proton are produced with high kinetic energy. These fast-moving particles travel through the gas, ionizing some of the remaining He-3 atoms and thus creating an equal number of positive and negative ions. The positive and negative ions serve as charge carriers in the gas, which is otherwise an insulator.

When a voltage is applied across the electrodes 15, 16 in the ion chamber 14, an electric field is created in the space between the electrodes. The ions move in response to this electric field with the positive and negative ions pulled in opposite directions toward opposite electrodes. The ions are eventually neutralized at electrodes 15, 16 resulting in an ion current that is directly proportional to the number of ions transferred to the electrodes. Such an ion current may be measured by the electronics module 17. The magnitude of this ion current is directly proportional to the number of ions transferred to the electrodes. The number of ions transferred is in turn proportional to the thermal neutron flux. Therefore, the ion current measured by the electronics module 17 may be used to derive the magnitude of the thermal neutron flux through ion chamber 14.

In theory, any current may be measured using a conventional ion chamber shown in FIG. 1. However, in real applications, the ion currents are very small, on the order of pico-amps ($10^{-12}$ A) or less, making it difficult to obtain accurate measurements. In addition, temperature and humidity drifts in the various electronic components, cables, etc. further reduce the accuracy of the measurements. Furthermore, leakage currents may also significantly degrade the accuracy of repeat measurements. Leakage current is a current through the detector system that is not due to ion transport through the ion chamber 14. Leakage currents may be due to cables, connections, parasitic current in the components, moisture contamination of the amplifier circuit or other components, or any number of other factors.

The positive and negative ions generated in the ion chamber may also collide and then recombine to form a neutral species. This recombination competes with ion transport to the electrodes, and, thus, reduces the measurable magnitudes of the ion currents. In the absence of an applied voltage across the electrodes, there will be no ion transport and the positive and negative ions will eventually recombine. When a voltage is applied across the electrodes 15, 16, the positive and negative ions are pulled in the opposite directions. If the voltage applied across the electrodes 15, 16 is small, the positive and negative ions travel slowly to the electrodes, resulting in more recombination. If the voltage applied across the electrodes 15, 16 is large, the ions travel quickly to the electrodes, resulting in less recombination. Thus, the voltage applied to the ion chamber has a direct effect on the magnitude of the measurable ion current.

Figure 2:
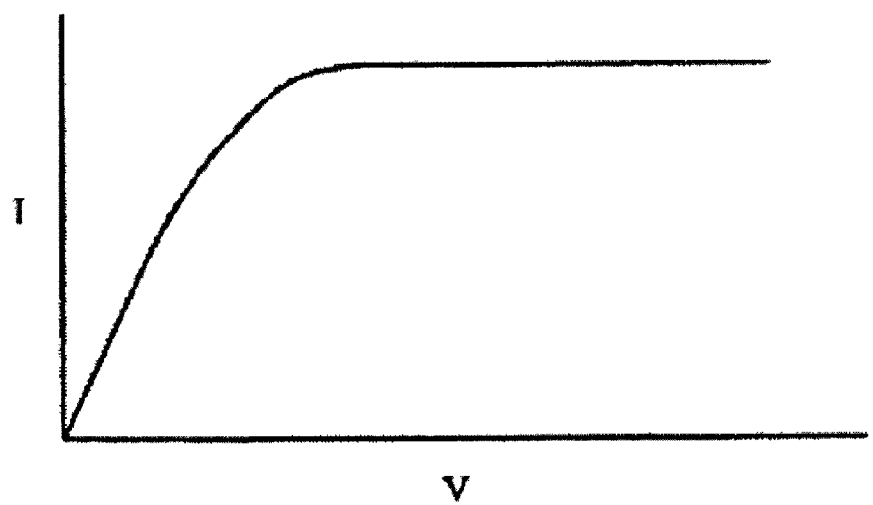
FIG. 2 shows a graph illustrating the relationship between the ion current and the voltage applied to a high voltage ion chamber.
Figure 3:
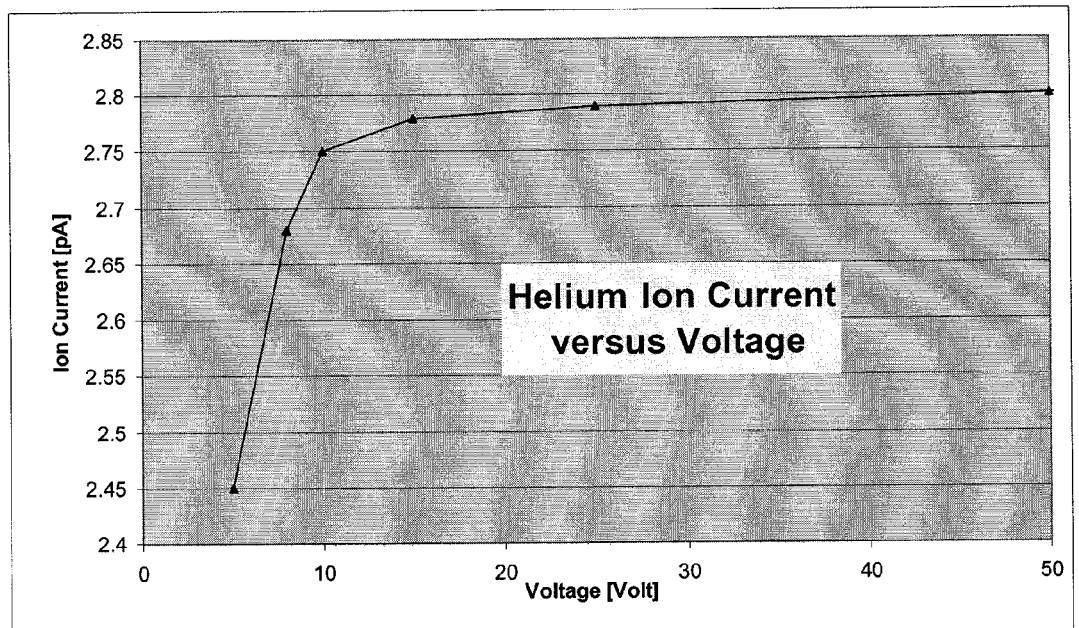
FIG. 3 shows a graph illustrating the relationship between the ion current and the voltage applied to a high voltage ion chamber filled with a gas of He-3.

FIG. 2 illustrates ion current (I) as a function of the voltage (V) applied across the two electrodes in an ion chamber for a detector filled with a gas such as He-3. FIG. 2 shows that no net current flows in the absence of an applied potential. The positive ions and negative ions generated under this condition will eventually disappear by recombination. As the applied potential increases, the positive and negative ions are separated more rapidly. As a result, the recombination diminishes, and the ion current increases. At a sufficiently high potential, the recombination will be reduced to an insignificant level. Under this condition, essentially all positive and negative ions formed are swept to the electrodes. Increasing the applied voltage further will not increase the ion current, because the measured signal is limited by the ionization process due to the neutron capture reaction. This so called "saturation region" is advantageous for application in ion chambers designed to precisely measure the flux of ionizing radiation through the chamber because fluctuations in the applied voltage have little effect on the measured ionization current. Thus, in this "saturation" region, the magnitude of the ion current is directly proportional to the rate of ionization (independent of the applied voltage), which is in turn proportional to the neutron flux. To capitalize on this effect, most ion chambers operate at high voltage in order to ensure that the device is operating in the saturation region.

Figure 4:
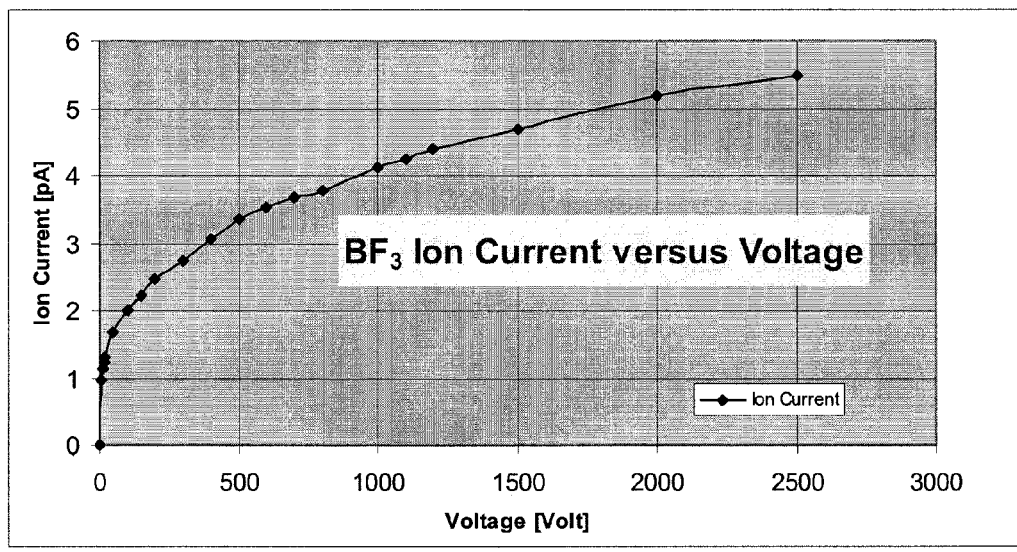
FIG. 4 shows a graph illustrating the relationship between the ion current and the voltage applied to a high voltage ion chamber filled with a gas of $BF_3$.

However, some gases (such as $BF_3$) that may be used in ion chambers for neutron analyzers, do not have this flat region of saturation. Rather, the I-V characteristic curve rises continuously with increasing voltage as shown in FIG. 4. It was therefore previously accepted that these detectors must be operated at a high voltage in order to maximize the ionization current.

Figure 5:
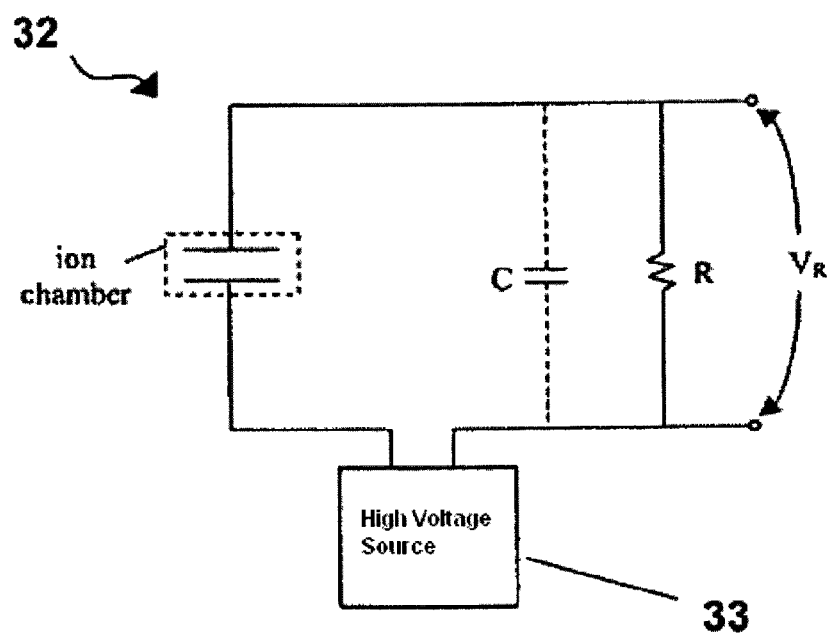
FIG. 5 shows a circuit for high voltage operation of an ion chamber.

FIG. 5 shows a conventional circuit 32 that may be used to operate a high voltage ion chamber. As shown, C represent the capacitance of the chamber plus any parallel capacitance, and $V_R$ represents voltage drop across the load resistor due to the ion current I flowing through the load resistance R, determined by the relation $V_R$=I R. In the absence of any ionization in the ion chamber, the current I is zero (except for a small leakage current), and $V_R$ is approximately 0V. When ionization occurs, ion transport occurs between the plates of the ion chamber resulting in an ion current I that then flows through the load resistance R.

As stated above, the applied high voltage results in a relatively large ion current in accordance with the I-V characteristic curve shown in FIG. 4. However, this rise in ion current is accompanied by an unavoidable rise in noise, and as the applied voltage is increased, this noise grows quickly, eventually dominating the ion current signal.

The rise in noise originates from the fact that the electrodes of the ion chamber form a capacitor with a capacitance C (as large as 10 pF in some designs). It is well known that a time varying voltage applied to a capacitor will produce a current that equals the time varying voltage multiplied by the capacitance, i.e., I=C dV/dt. Accordingly, noise in the applied voltage will lead to corresponding current noise through the ion chamber and the amplitude of this current noise is directly proportional to voltage noise multiplied by the chamber capacitance. It is also common for the voltage noise of any power supply to increase with higher output voltage. Therefore, due to the capacitative action of the chamber electrodes, a higher applied voltage produces a larger ion current noise.

In addition, in an industrial environment, the capacitance of the chamber itself may change in time due to vibrations of the electrodes because C is inversely proportional to the distance d between the electrodes (C∝1/d). Consequently, even with a perfectly stable applied voltage, any vibration of the chamber could potentially create a time varying capacitance and, thus, additional current noise that is proportional to the applied voltage according to the relation I=dC/dt V.

Figure 6:
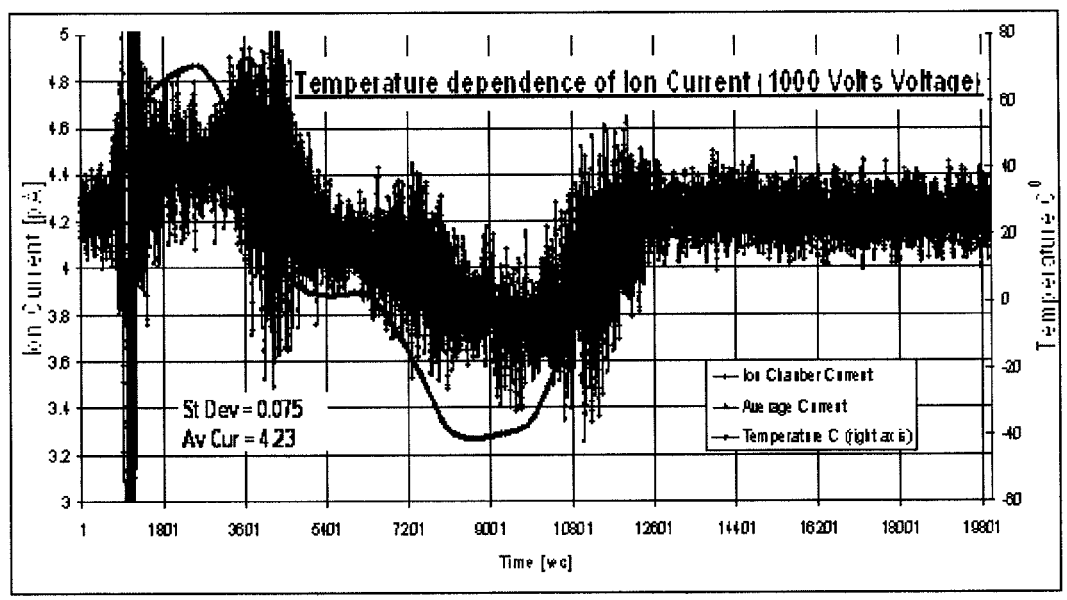
FIG. 6 shows the noise and temperature dependence of the ion current as a function of time for a prior art ion chamber filled with $BF_3$ and operated at 1000V.

FIG. 6 shows a plot of ion current vs. time for a ionization chamber filled with a gas of $BF_3$ operating at an applied voltage $V_0$=1000V for various temperatures. It can be seen that, at best, the signal-to-noise ratio has value of 28 (for stable temperature conditions). Signal-to-noise here is defined to be the ratio of the mean signal to twice the standard deviation (or noise amplitude) of the signal. In addition, during temperature changes, the noise for the 1000 V ion chamber increases by about a factor of 2 relative to stable temperatures. In many situations it becomes desirable to have a higher signal-to-noise ratio for the ionization current.

Figure 7:
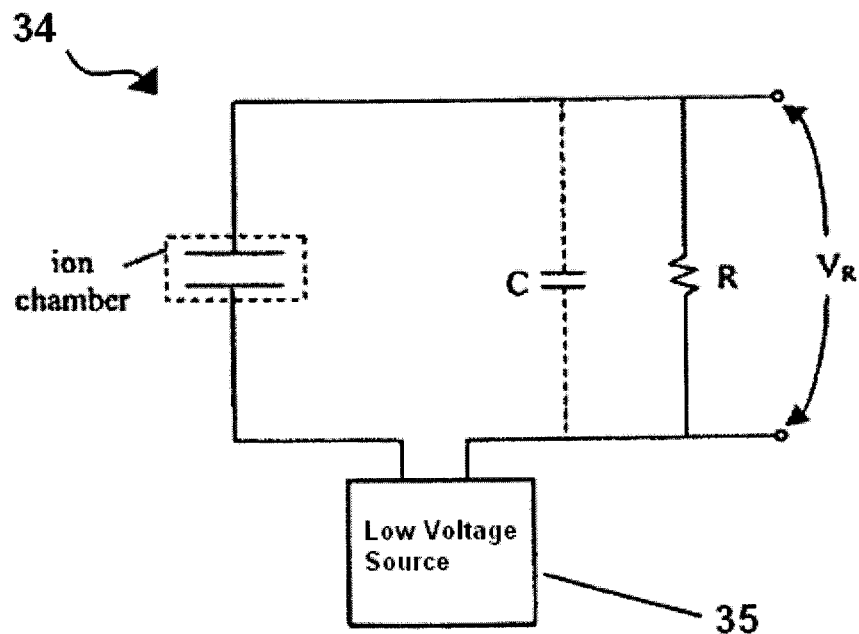
FIG. 7 shows a circuit for low voltage operation of an ion chamber in accordance with one embodiment of the present disclosure.
Figure 8:
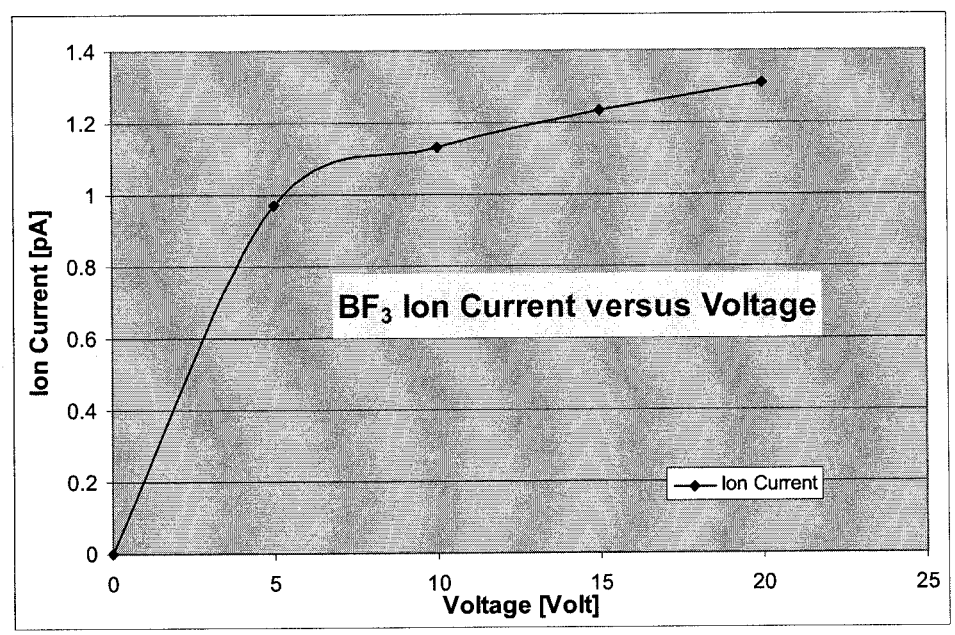
FIG. 8 shows a graph illustrating the relationship between the ion current and the voltage applied in accordance with one embodiment of the present disclosure.

One embodiment of the present disclosure relates to a method for operating an ionization chamber at a low applied voltage $V_0$ in the range of about 5V to about 20V. FIG. 7 shows a circuit that may be used to operate a low voltage ionization chamber according to one embodiment of the present disclosure. Low Voltage Source 35 is used to supply a voltage $V_0$ in the range of about 5V to about 20V to the electrodes of the ion chamber. FIG. 8 shows the I-V characteristic for such a chamber filled with $BF_3$.

Figure 9:
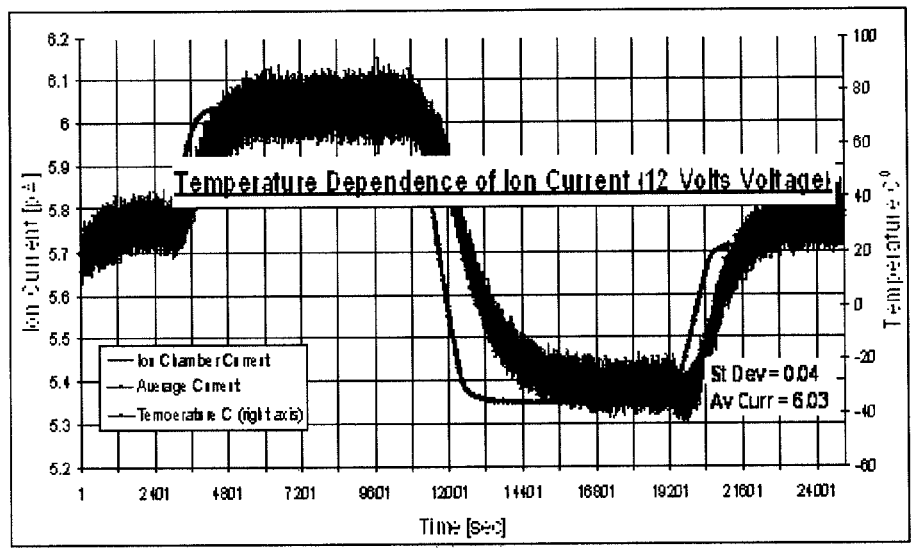
FIG. 9 shows the noise and temperature dependence of the ion current as a function of time in accordance with one embodiment of the present disclosure.

FIG. 9 shows a plot of ion current vs. time for a ionization chamber identical in geometry to that used for the data shown in FIG. 6. However, this chamber was operated according to one embodiment of the present disclosure with the relatively low applied voltage $V_0=12V$. It can be seen that this low voltage configuration produces a definite improvement over its high voltage counterpart, producing a signal-to-noise ratio of nearly 75. In addition, the signal-to-noise does not decrease during rapid temperature changes as is the case for high voltage configuration.

In accordance with one embodiment of the present disclosure, the circuit shown in FIG. 7 may contain a low voltage source 35 that may be any low voltage source circuitry known in the art and may, for example, operate in either constant voltage mode or a pulsed mode. When implemented with pulse mode circuitry, the low voltage source may provide an ion transport voltage to the ion chamber for a selected duration (i.e., a voltage pulse). In addition, the low voltage source circuitry 35 may be used to provide a ramping voltage (or other shaped voltage pulse) to the ion chamber, to be described later.

In accordance with a method of the present disclosure, the magnitude of the ion transport voltage is optimized. First, an ion transport current signal caused by an ion transport high voltage applied to the ion chamber electrodes is determined. An example of an ion transport current signal caused by a ion transport high voltage is shown in FIG. 6. Next, the ion transport high voltage is reduced to a value within an optimum range of ion transport voltages.

The optimum range of ion transport voltages may be determined by considering the trade-off between a large average value of the ion transport current signal caused by the ion transport voltage (e.g., 4.23 pA in FIG. 6) and a small noise amplitude associated with the ion transport current signal (e.g., 0.075 pA in FIG. 6). The average value of the ion transport signal, as well as the noise amplitude of the ion transport signal, are complicated functions of many variables including, but not limited to, chamber electrode geometry, type of gas contained in the detector, detector temperature, external vibration present in the detector environment, leakage current, noise characteristics of the electronics module, etc. For a given detector in a given environment, a minimum value for the optimal ion transport voltage is determined to be the voltage below which the average ion current transport signal is too small to be accurately determined. Likewise, a maximum value for the optimal ion transport voltage is determined to be the ion transport voltage which results in a noise amplitude associated with the ion transport current signal that is so large that the ion transport current signal cannot be accurately determined.

To reduce noise, the ion transport voltage cannot be reduced indefinitely because eventually, the average ion current transport signal is too small to be reliably measured. Likewise, the usable average ion transport current cannot be increased indefinitely by increasing the ion transport voltage because at high voltages, the ion transport current signal will be so noisy as to negatively affect its reliable measurement. Thus, to optimize the ion transport voltage, one must consider the tradeoff between low noise and large average ion current signals.

FIG. 8 shows an example of an I-V characteristic curve for an ion chamber filled with $BF_3$ in accordance with one embodiment of the present disclosure. In this example, a relatively steep slope of the I-V characteristic curve below about 5V leads to a minimum optimal voltage of about 5V. This is the minimum voltage that will guarantee an ion current signal large enough to be accurately measured. Above about 20V (not shown) the noise amplitude of the ion current signal begins to negatively affect the accuracy of the ion current signal measurement. Thus, about 20V is chosen, for this example, as the maximum value for the optimal ion transport voltage. Accordingly, in operation, the optimal operation voltage is chosen to be within the range of about 5V to about 20V. One example of an ion transport current signal caused by an optimal ion transport voltage of 12V is shown in FIG. 9 with a corresponding average value of the ion transport current signal of 6.03 pA and a noise amplitude associated with the ion transport current signal of 0.04 pA.

Those having ordinary skill in the art will recognize that the precise values of the minimum optimal voltage, maximum optimum voltages, and optimal ion transport voltage depends on many variables including, for example, electrode design, operational environment (temperature, humidity, vibration, etc.), and the specific gas used in the detector and, therefore, the values for the minimum and maximum optimum voltage not limited to the exact values discussed above.

Figure 10:
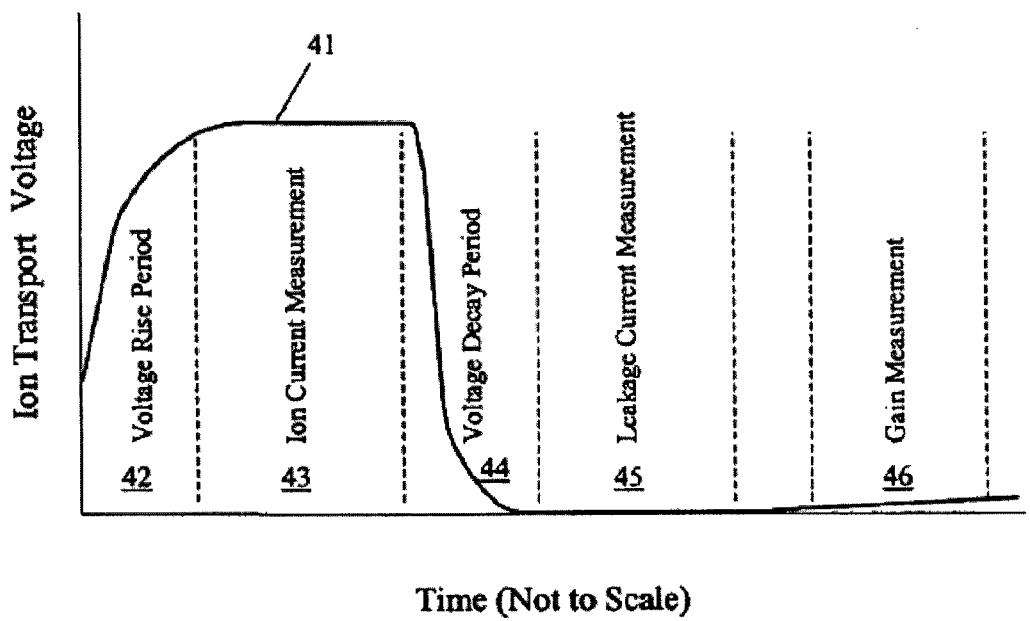
FIG. 10 shows a voltage curve as a function of time in a pulse mode operation in accordance with one embodiment of the present disclosure.

In accordance with a method of the present disclosure, the ion transport voltage (i.e., the potential applied across the electrodes in the ion chamber) is applied, allowed to stabilize for a selected duration, and then turned off, as shown in FIG. 10. The voltage curve as a function of time is shown as 41, which may be dissected into several time periods. As shown, in period 42, the ion transport voltage first gradually increases. The rate of this increase is determined by the RC time constant of the circuitry. Eventually the voltage reaches a maximum in period 43. During period 43, ions in the ion chamber, which are formed by the neutron flux before the voltage is applied, are pulled to the electrodes, creating an ion current. The ion current may then be detected as a voltage signal ($V_R$) across the load resistance R. Note that the magnitude of a voltage signal ($V_R$) measured during period 43 may include that from the ion current generated by the neutron flux and that from the leakage current.

Once the ion current measurement is complete (or after the selected duration), the voltage supplied to the electrodes in the ion chamber is turned off, which results in voltage decay in period 44. The voltage eventually decays to zero. The rate of this decay is determined by the RC time constant of the circuitry. The voltage is kept off for the time period 45, during which no signal from ion transport should be detectable.

Another measurement may be taken during period 45 corresponding to the leakage current. The difference between the measurements obtained in periods 43 and 45 may be used to derive the desired measurement—the current due only to ion transport and thus directly related to neutron flux through the ion chamber.

The leakage current may be measured for every measurement cycle such that the leakage current reference is only seconds or fractions of a second old. Temperature, humidity, and long term drift effects operate on much longer time scales, and, thus, remain substantially constant between measurements. Accordingly, these slowly changing effects are cancelled out in the difference measurements. Because the leakage currents may be on the same order of magnitude as the ion transport currents, subtracting the leakage currents from the raw measurements may provide a dramatic improvement to the repeatability and accuracy of the ion current measurements.

Figure 11:
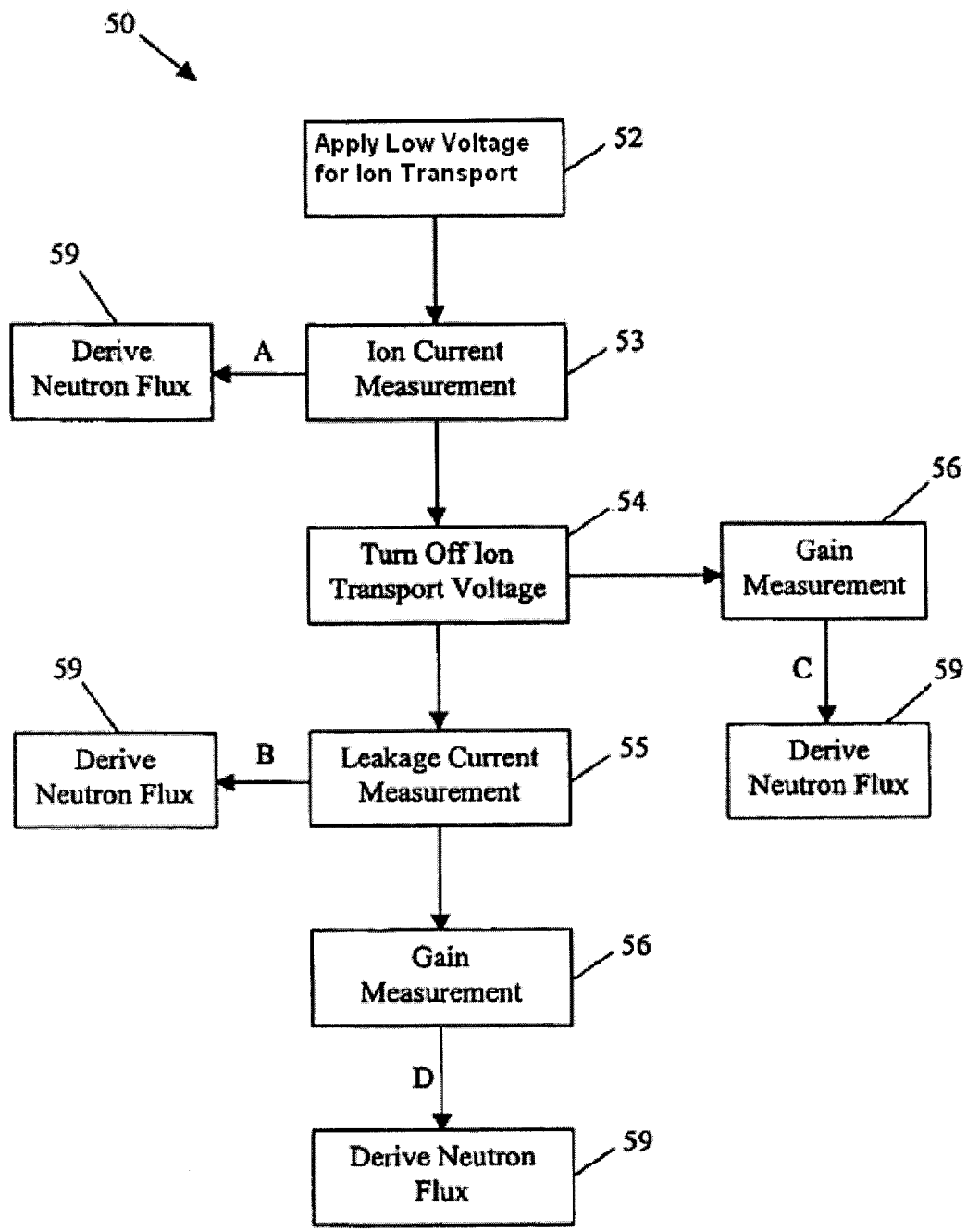
FIG. 11 shows a flow chart illustrating several methods for detecting high-energy radiation in accordance with one embodiment of the present disclosure.

Some methods of the present disclosure for ion transport measurements are illustrated as a flow chart 50 in FIG. 11. The method described above corresponds to method B in FIG. 11. Method B includes the steps of turning on ion transport low voltage (step 52), measuring ion currents (step 53), turning off ion transport low voltage (step 54), and measuring the leakage current after the ion transport low voltage is turned off (step 55). The difference between the measurements taken in step 53 and 55 is then used to derive the ion currents that result from neutron flux (step 59).

In accordance with some embodiments of the present disclosure, the gain of the amplifier in the circuit may also be measured and calibrated. To do this, a very small voltage ramp (or other characteristic non-DC pulse) is applied to the ion chamber, during period 46. This voltage is much too small to drive ion transport, but the ion chamber will act as a capacitor and thus there will be a small current. As long as the capacitance of the ion chamber does not change (given that the geometry is fixed and the gas is inert, changes are unlikely), the input to the amplifier will be the leakage current (which is measured as described above) plus the calibration current (which is known). Thus, the gain may be easily computed and adjusted so that the measurements to be compared are obtained with the same gain. Alternatively, the gain thus obtained may be used to calibrate (adjust) the ion current measurements so that they are of the same gain before a difference between two measurements is obtained.

This method is illustrated as method D in FIG. 11. Method D includes the steps of turning on ion transport low voltage (step 52), measuring ion currents (step 53), turning off ion transport low voltage (step 54), measuring leakage current (step 55), and measuring the gain (step 56). The gain obtained in step 56 may be used to control the measurements during signal acquisition or before a difference measurement is derived from the measurements made in step 53 and 55. The difference measurement may then be used to derive the ion current.

Some embodiments of the present disclosure use a simpler approach, which does not measure leakage currents (i.e., skipping period 45 in FIG. 10). A method in accordance with such embodiments of the present disclosure assumes that the gain of the signal amplifier does not change within the short period when the measurements are made. The measurement with the ion transport low voltage turned on (period 43 in FIG. 10) corresponds to the sum of the ion transport current and the leakage current. The measurement with the very small voltage ramp (period 46 in FIG. 10) corresponds to the calibration current plus the leakage current. The difference between these two measurements gives the signal current (ion transport current) minus the (known) reference current. Therefore, the ion transport currents may be derived from the difference measurements.

When the magnitude of the signal current (ion transport current) equals that of the reference current, the difference is zero, and thus any drift in gain is irrelevant. However, when there is a substantial difference between the magnitudes of the signal and reference currents, gain drift may result in errors. Thus, this method may be less accurate than the methods described above. However, as noted above, the gain may be separately calibrated from the signals measured during period 46 and used to improve the accuracy of the ion transport measurements, if so desired.

A method corresponding to this approach is illustrated as method C in FIG. 11. Method C includes the steps of turning on ion transport low voltage (step 52), measuring ion currents (step 53), turning off ion transport low voltage (step 54), and measuring the gain (step 56). The difference between the measurements taken in step 53 and 56 is then used to derive the ion currents that result from neutron flux (step 59).

In all embodiments described above (e.g., methods B, C, and D in FIG. 11), the ion current is measured (step 53). In addition, the leakage current (step 55), gain calibration current (step 56), or both may be measured, depending on the methods used. In accordance with some embodiments of the present disclosure, only the ion current is measured and no compensation for the leakage current is provided. This method is illustrated as method A in FIG. 11, which includes three steps: turning on ion transport low voltage (step 52), measuring ion currents (step 53), and deriving neutron flux from the measurement taken in step 53 (step 59).

The flow chart 50 in FIG. 11 illustrates several methods for ion transport measurement in accordance with embodiments of the present disclosure. One of ordinary skill in the art will appreciate that other modifications are possible without departing from the scope of the present disclosure. For example, these methods may be used in combination and the results may be cross-checked for accuracy or for quality control. For example, unexpected change in the gain of the system may be identified from an unexpected discrepancy between the results from methods B and D. Similarly, the magnitudes of leakage currents may be inferred from a comparison between results obtained from methods C and D.

In order to understand the additional advantages of a pulse mode operation, it is necessary to consider the reaction kinetics of the system. As an example, for an ion chamber filled with He-3, under normal conditions, a vast majority of the gas atoms in the ion chamber are unionized He-3. Thus, the concentration of the He-3 gas remains substantially constant, and from Equation (1), the rate of ion production depends linearly on only the neutron flux.

As noted above, ions are consumed by two independent mechanisms—ion current flow (ion transport to the electrodes) and recombination. When an electric field is applied across the ion chamber, the ions move in response to the electric field with the positive and negative ions pulled in opposite directions toward opposite electrodes. The ions are eventually neutralized at the electrodes resulting in an ion current. When the potential is held constant, the rate of ion consumption is linearly dependent on (first order in) the ion concentration. When no electric field is applied, the ion consumption term due to neutralization at the electrodes goes to zero.

In order for an ion to be neutralized in the gas (recombination) rather than at the electrode, it must collide with an ion having an opposite charge. The probability of such collision depends on the concentrations of the positive ions and the negative ions. Therefore, the recombination reaction is subject to the second order kinetics, one order each on the concentrations of the positive ions and the negative ions. Accordingly, ion recombination is insignificant when the ion concentrations are low, and it will become significant when the ion concentrations are high.

When the concentration of ions is small, the ion consumption term with the first order kinetics (i.e., current flow to the electrodes) dominates, and the ion consumption term with the second order kinetics (i.e., recombination) is relatively small. If the electric field is applied continuously (as in the constant voltage operation), the ion chamber comes to an equilibrium, in which the rate of ion consumption by the current flow accounts for a large fraction of the ions produced by neutron flux, and the rate of consumption by recombination is relatively small.

If the electric field is applied intermittently (e.g., in a pulse mode), the above described equilibrium does not occur. When the field is turned off, ion consumption by current flow stops. Ion concentration increases because ion production by neutron interactions continues, but ion consumption by recombination is insignificant and will remain insignificant until ion concentrations increase substantially. Eventually an equilibrium will be reached when ion consumption by recombination equals ion production by neutron flux, but this will take a relatively long time.

When the ion transport voltage is turned on, initial current flow will be high (relative to current flow with a continuous field) because ion concentration will have had time to build up. The larger current will be easier to measure, and the leakage current will be relatively small. Thus, the simple method A in FIG. 11 will produce a result more accurate than the conventional constant current mode can.

At the first glance, it may seem possible to make the ion current very large in a pulse mode by making the duty cycle (the fraction of time when the electric field is applied to the total cycle time) very small, but this is not the case for the following reasons. First, there is a practical minimum time required to measure the ion current. Second, some ions will be consumed by ion transport before the voltage stabilizes. Third, more ions are lost to recombination when ion concentration increases. Finally, the statistical fluctuation in measurement is increased since the total number of ions collected during a measurement is reduced. Thus, a cycle time and duty cycle are preferably selected such that the statistical uncertainty (due to the physics of neutron production) equals the measurement uncertainty (due to the limitations of the electronics). This will allow for minimum uncertainty of measurement.

The above description illustrates embodiments of the present disclosure as applied to ion chambers designed to detect neutrons. However, as noted above, embodiments of the present disclosure are not limited to neutron detection. Instead, a pulse mode operation in accordance with embodiments of the present disclosure is also applicable to ion chambers that are designed to detect other forms of high-energy radiation, such as gamma rays, X-rays, $\alpha$-particles and $\beta$-particles.

For example, the high energy photons (or electromagnetic waves) from, for example, X-ray or gamma ray, may pass through the ion chamber wall (or window) and be absorbed by or interact with (or Compton scattered from) electrons in the gas molecules, producing high energy electrons. The resultant high-energy electrons would then form multiple ions by collision with electrons in other gas molecules. The net result is the generation of ions at a rate proportional to the high energy photon (or electromagnetic wave) flux. Once the ions are generated, other aspects of the operation of the device are the same as described above.

In accordance with another method of the present disclosure, the ion transport voltage is a low voltage with an alternating polarity. A positive low voltage is applied and allowed to stabilize. A positive ion current is measured. As with previously described embodiments, this measurement will include a leakage current. The voltage polarity is then reversed and allowed to stabilize at the negative transport low voltage. Any ions in the ion chamber will now be accelerated in an opposite direction. A negative ion current is measured, which will include a leakage current.

The leakage current is primarily due to the characteristics of the semiconductor components. It does not depend on the amplitude or the polarity of the voltage. Thus, the leakage current will add to the ion current measured in one phase and it will subtract an approximately equal but opposite amount from the ion current measurement in the other phase. By computing the average (i.e., the arithmetic mean) absolute value of the ion current measurements from each phase, the leakage current component of the measurements will be eliminated. The resulting value may represent only the current due to ion transport in the ion chamber.

In some embodiments, the computations of the average may be done for every measurement cycle. In such a case, the leakage current references will be only a small fraction of a second old. In addition, temperature and long-term aging effects operate on larger scales and will likewise be removed from the measurement.

The voltage for an alternating low voltage may have any form that is known in the art or later devised. For example, FIG. 12, described below, shows a square wave. A square wave is conceptually simple, and it allows a design with a small number of components, thus minimizing leakage. Because the reversal of polarity compensates for leakage current, other functions, such as a sinusoidal wave, may be used without departing from the scope of the present disclosure.

Figure 12:
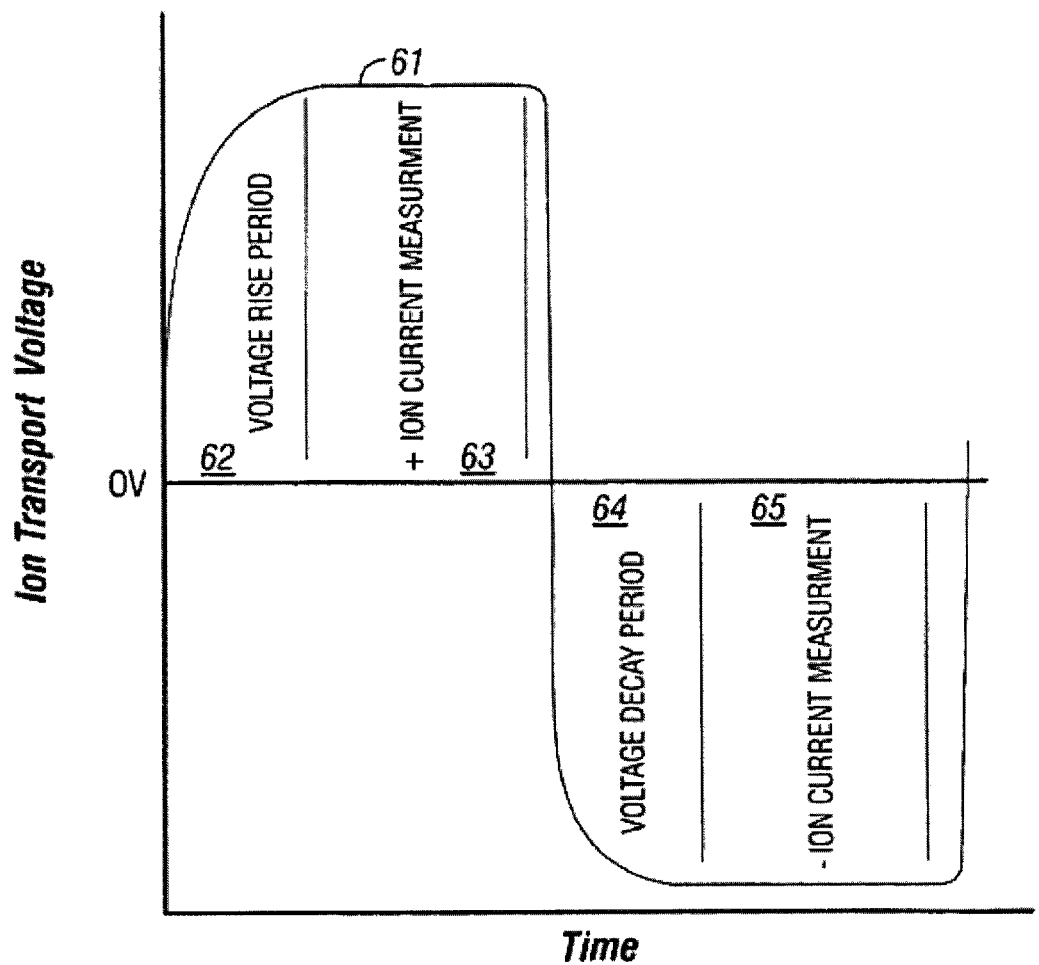
FIG. 12 shows a voltage curve as a function of time in a pulse mode operation in accordance with one embodiment of the present disclosure.

FIG. 12 shows a voltage curve 61 versus time for a low voltage in accordance with one embodiment of the present disclosure. In the first period 62, a positive ion transport low voltage is applied, and the voltage 61 rises and stabilizes at the applied voltage. In the next period 63, the positive ion current is measured. This measurement may include a leakage current due to things other than ion transport in the ion chamber.

The next period is the voltage reversal period 64. The polarity of the applied low voltage is reversed, and the voltage 61 drops rapidly and stabilizes at the negative voltage. In the negative ion current measurement period 65, the ion current is again measured. As with the positive ion current measurement 63, the negative ion current measurement will include the leakage current. The direction of the ion transport current will be in the opposite direction, but the leakage current will be in the same direction as it was for the positive ion current measurement. The leakage current may be cancelled out by computing the average of the absolute values for the positive and negative ion current measurements.

In addition, the gain of the amplifier may be measured and calibrated, as described above, even using an alternating voltage. In some embodiments, the gain measurement and calibration may not be performed with every alternating cycle. Instead, it may be performed at selected intervals.

Figure 13:
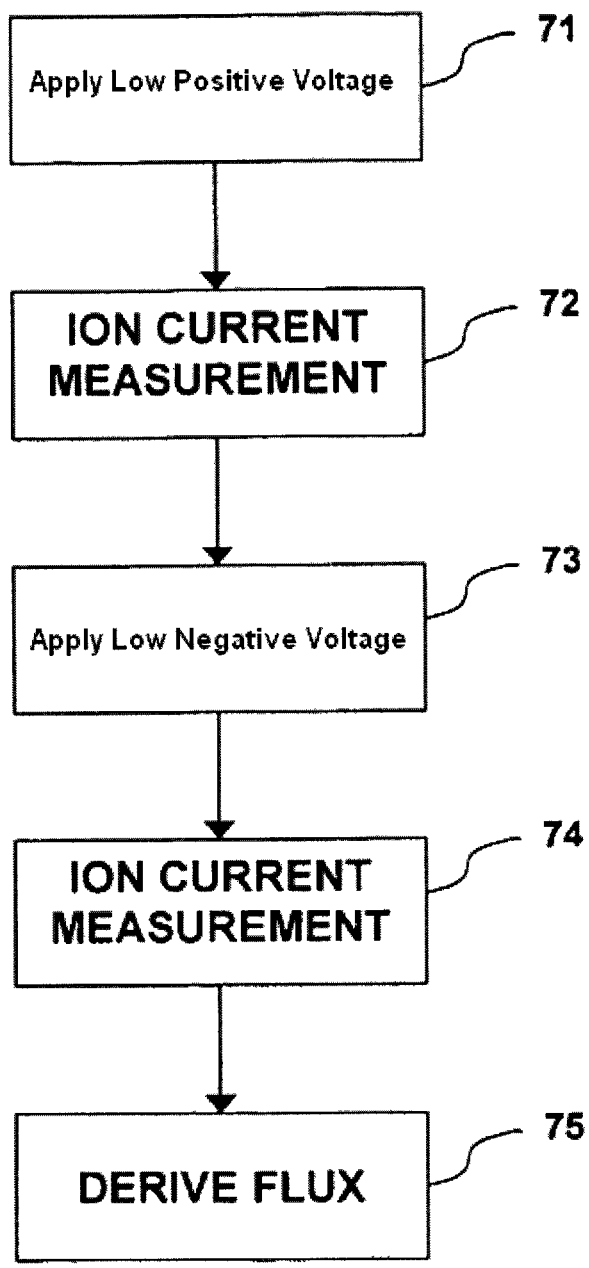
FIG. 13 shows a flow chart illustrating a method for detecting high-energy radiation in accordance with one embodiment of the present disclosure.

FIG. 13 shows a method in accordance with the present disclosure. The method may include applying a positive low voltage 71. This will induce ions in the ion chamber to move toward an electrode with an opposite charge. The method may next include measuring a positive ion current measurement 72. This measurement may include a leakage current. The method may include applying a negative low voltage 73. This will cause any unconsumed ions in the ion chamber to reverse direction and induce them to move toward the other electrode. The method may then include making a negative ion current measurement 74. This measurement may also include a leakage current of the same polarity as present in the positive measurement.

Determining the flux 75 may include calculating the leakage free ion current measurement. This may include taking the mean of the absolute values of the positive and negative measurements. For example, the following equation shows one possible calculation for determining the leakage free ion current ($V_{IC}$) based on the positive measurement ($V_+$) and the negative measurement ($V_-$):

$$V_{IC} = \frac{|V_+| + |V_-|}{2} \quad (2)$$

Other computations and equations may be devised by skilled artisans without departing from the scope of the present disclosure. For example, in some embodiments, the negative measurement ($V_-$) may be inverted (i.e., made positive) and added to the positive measurement ($V_+$). Because the leakage current adds to one and subtracts from the other, the resulting value will represent the ion current ($V_{IC}$) without the leakage current effects.

An additional embodiment of the present disclosure makes uses low voltage resonance methods. Using a selected frequency and/or amplitude for the alternating voltage, only a fraction of the ions in the ion chamber will be consumed during a given period. For example, by reducing the amplitude of the alternating voltage, the fraction of ions that do not reach an electrode may be increased. These ions will accelerate in one direction (e.g., under the positive drive voltage), and when the polarity is reversed, these ions will accelerate in the opposite direction (e.g., under the negative drive voltage). These ions will essentially travel back and forth between the electrodes and will only be subject to consumption by recombination. The response time of the detector will be increased by the amount of time that is required for the ion chamber to reach equilibrium in this resonance mode. However, because this happens in a fraction of a second, it is not a significant problem with respect to neutron measurements. Because the total number of ions increases in this resonance mode, the total measured current for a given neutron flux will also increase when the ion transport voltage is turned on. This will provide a higher magnitude signal for a give neutron flux.

Advantageously, embodiments of the present disclosure may be used to provide methods and apparatuses for more accurate measurements of high-energy radiation using low voltage operation that results in higher signal-to-noise when compared to traditional high voltage detectors. In addition, without constantly loading the system with a high voltage, the device may not wear out as quickly and less energy may be consumed.

Advantageously, embodiments of the present disclosure may also be used to provide methods and apparatuses for more accurate measurements of high-energy radiation using low voltage pulse mode operation that can produce stronger signals than a constant low voltage operation while having higher signal-to-noise than a high voltage pulse mode operation.

Also advantageously, embodiments of the present disclosure may be used to provide methods and apparatuses using low voltage resonance methods. This may provide a higher magnitude signal for a given neutron flux than a constant low voltage operation while having higher signal-to-noise than a high voltage resonance mode operation.

Advantageously, embodiments of the present disclosure can be used to provide methods that may be used to derive the ion transport currents from the pulse mode operation. In addition, such methods may allow for ease in correcting for leakage currents or calibrating the gain of the system.

Advantageously, embodiments of the present disclosure may be used to provide methods that provide convenient ways to control quality and/or monitor leakage currents and/or system gains.

While the present disclosure has been described with respect to a limited number of embodiments, those skilled in the art, having benefit of this disclosure, will appreciate that other embodiments can be devised which do not depart from the scope of the present disclosure as disclosed herein. Accordingly, the scope of the present disclosure should be limited only by the attached claims.

What is claimed is:

1. A method for measuring high-energy radiation flux, comprising:
applying a low voltage to electrodes in an ion chamber filled with a fluid capable of forming ions through the interaction of the fluid with high energy radiation, wherein the low voltage is in a range of about 5 V to about 20 V, and the fluid comprises boron trifluoride or compounds thereof, or at least one selected from helium-3, lithium-6, uranium-233, uranium-235, slutonium-239, and compounds thereof;
measuring an ion current signal related to an ion current induced by the low voltage;
determining a leakage current;
determining a gain of an amplifier;
determining a magnitude of the high-energy radiation flux based on the ion current signal, gain, and leakage current; and
outputting the result of the magnitude of the high-energy radiation flux.

2. The method of claim 1 wherein the fluid has a property that a number of ions created by the high energy radiation increases with increasing voltage in the range of applied voltages.

3. The method of claim 1 wherein determining the leakage current comprises decreasing the low voltage to the electrodes in the ion chamber and measuring the leakage ion current signal induced by the leakage current.

4. The method of claim 1 wherein determining the gain comprises applying a small enough time-varying voltage across the electrodes that ion transport does not occur but the ion chamber conducts a small calibration current due to the time-varying voltage.

5. The method of claim further comprising:
applying a first voltage to electrodes in an ion chamber filled with the fluid capable of forming charged ions by high energy radiation,
measuring a ion current signal related to an ion current induced by the first voltage;
lowering the first voltage to the low voltage, the low voltage being in an optimum range of ion transport voltages.

6. The method of claim 5 wherein the fluid has a property that a number of ions created by the high energy radiation increases with increasing voltage in the range of applied voltages.

7. A method for measuring high-energy radiation flux, comprising:
applying a low voltage to electrodes in an ion chamber filled with a fluid capable of forming ions through the interaction of the fluid with high energy radiation, wherein the low voltage is in a range of about 5 V to about 20 V, and the fluid comprises boron trifluoride or compounds thereof, or at least one selected from helium-3, lithium-6, uranium-233, uranium-235, plutonium-239, and compounds thereof;
measuring a ion current signal related to an ion current induced by the low voltage;
applying the low voltage at a negative polarity across the electrodes;

measuring a negative ion current signal related to ion currents induced by the low voltage at the negative polarity;

determining a magnitude of the high-energy radiation flux based on the positive and negative ion current signals;

outputting the result of the magnitude of the high-energy radiation flux;

applying a time varying voltage across the electrodes such that the ion chamber conducts a current small enough that ion transport does not occur; and determining a gain.

8. The method of claim 7 wherein the time varying voltage is applied as a periodic waveform wherein one or both of the amplitude and frequency of the waveform are adjusted such that ions in the ion chamber are subject to consumption dominated by recombination of the ions.

9. The method of claim 7, wherein the determining the magnitude of the high-energy radiation flux comprises taking an average of an absolute value of the positive ion current signal measurement and an absolute value of the negative ion current signal measurement.

10. The method of claim 7 wherein the fluid has the property that the number of ions created by the high energy radiation increases with increasing voltage in the range of applied voltages.

* * * * *

UNITED STATES PATENT AND TRADEMARK OFFICE
CERTIFICATE OF CORRECTION

| | | |
|---|---|---|
| PATENT NO. | : 8,415,638 B2 | Page 1 of 1 |
| APPLICATION NO. | : 12/852347 | |
| DATED | : April 9, 2013 | |
| INVENTOR(S) | : Alexander Joseph Esin et al. | |

It is certified that error appears in the above-identified patent and that said Letters Patent is hereby corrected as shown below:

In the Claims

At column 14, claim number 1, line number 18, "slutonium-239" should read -- plutonium-239 --

At column 14, claim number 5, line number 1, "The method of claim further" should read -- The method of claim 1 further --

Signed and Sealed this
Thirtieth Day of July, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,415,638 B2 | Page 1 of 1 |
| APPLICATION NO. | : 12/852347 | |
| DATED | : April 9, 2013 | |
| INVENTOR(S) | : Alexander Joseph Esin et al. | |

It is certified that error appears in the above-identified patent and that said Letters Patent is hereby corrected as shown below:

In the Claims

At Column 14, lines 18-19 (Claim 1, lines 9-10), "slutonium-239" should read -- plutonium-239 --

At Column 14, line 42 (Claim 5, line 1), "The method of claim further" should read -- The method of claim 1 further --

This certificate supersedes the Certificate of Correction issued July 20, 2013.

Signed and Sealed this
Twentieth Day of August, 2013

Teresa Stanek Rea
*Acting Director of the United States Patent and Trademark Office*